Aug. 4, 1959     C. W. BULLER     2,897,626

FISH HOOK DISGORGERS

Filed Dec. 5, 1955

INVENTOR.
CHARLES W BULLER
BY
ATTORNEY

United States Patent Office 2,897,626
Patented Aug. 4, 1959

2,897,626

FISH HOOK DISGORGERS

Charles W. Buller, Moline, Ill.

Application December 5, 1955, Serial No. 551,122

3 Claims. (Cl. 43—53.5)

The invention relates to a device that is inserted into the mouth of a fish to release a fish hook embedded in the tissues of the fish's mouth.

Such devices, as now known, generally consist of a rod or stick that is pushed down into the gullet in a manner that the end of the rod follows the fish line until it engages the hook. The hook is then poked out of engagement with the fish's mouth and, if all has gone as anticipated, the fish hook should now rest over the end of the rod. Since the path of the stick is not visible, this requires following the line by "feeling." The string must be held tight to hold the fish hook in position across the end of the rod and both can now be removed.

One such device is shown in a Patent 1,629,583, granted on May 24, 1927 to M. E. Nelson.

Even though the Nelson patent above referred to places the string in a fork at the end of the stick, the fork may not follow the string and fail to contact the hook.

Since one hand is occupied in holding the fish, only one hand is available to guide the rod down alongside the fish line and to draw the fish line back out while the rod is pushed in to loosen the hook, a difficulty is experienced in the use of existing fish hook disgorgers.

By contrast, the invention assures that each insertion of the fish hook disgorger will release the hook without the need of any attention on the user's part to assure himself that the rod is following a path related to the fish line after it has entered the gullet.

The invention provides an entirely novel method of removing a fish hook, be it single, double, or triple barbed, in which a stick is stuck into the gullet of the fish without any worry as to whether it follows the fish line.

If the fish hook is of the single barbed type, the fish hook disgorger is seized by the coiled end and the point thrust into the fish's gullet without any attempt to follow the fish line. Then the fish line is given a turn around a stud or pin on the side of the stick, and the stick then turned about its axis and, after a few turns, removed while still being turned. Without any attention on the part of the fisherman, the forward end of the stick has, while thus being turned, moved under the fish hook, the fish hook has been placed in a position where it may be turned about a fulcrum that lifts the hook out of the tissue of the fish's mouth, and the hook has been freed and drawn into a groove in the stick that permits the stick to be removed from the gullet with the fish hook.

If the fish hook is of the double or triple barbed type the same device is used, but it is now seized at the pointed end. As before the fish line is turned around the stud. The end of the rod having the spiral is then moved in a manner to be described relative to the fish line so that the fish line passes through all its coils. It has been found that about two coils of decreasing radius functions best. Again the rod is pushed down into the gullet without attention on the part of the fisherman. The fish line passing through the coils will guide the rod to the fish hook, enable the rod to release the fish hook from the tissues of the fish and hold the fish hook barbs against the coils of wide diameter while the rod is being withdrawn.

Figure 1:
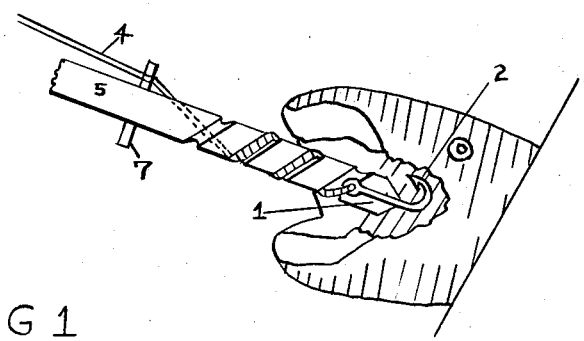
Figure 1 shows the invention in perspective as applied to a hooked fish that is shown partially in section.
Figures 2, 3:
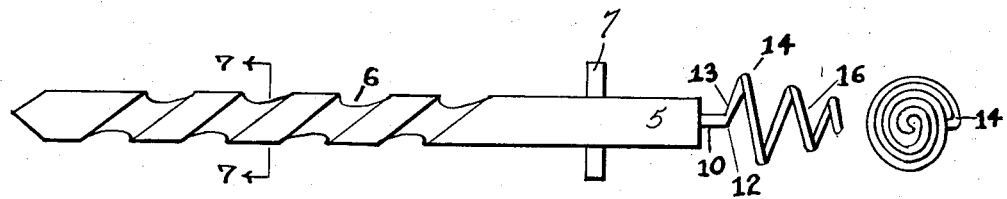
Figure 2 shows the invention in elevation.
Figure 3 shows an end view of the invention shown in Figure 2.

In these drawings, 1 indicates a fish hook having a point 2 and an eye 3 to which the fish line 4 is attached. The rod 5 which may be made of wood, plastic, or metal has a spiral groove 6. Projecting from the side of the rod 5 is a stud 7.

The wire 10 is fastened in the axis of the rod 5. It is provided with a substantially right angled bend 12 and the portion 13 extends out to the point 14 which is at the widest part of the spiral. Beginning at 14, the wire is bent into a spiral. This spiral has a steadily decresing radius about the axis 16. This wire 10 forms a spiral ball shaped handle that may readily be grasped by the hand of the fisherman. Since the rod 5 is necessarily of small diameter to enter the gullet of a fish, and both the rod and the fisherman's hand are apt to be wet, this handle consisting of a rigid spiral, of larger diameter than the rod, greatly facilitates the proper manipulation of the rod.

The diameter of the widest coil of this spiral is greater than the distance between the barbs 11 of a double or triple fish hook.

Having described the invention its use under various conditions will be described.

In applying the invention it is assumed that the fish has swallowed hook 1 and that the fish has been brought ashore. If the hook is of the single barbed type the rod 5, grasped with the spiral end in the left hand, is inserted into the mouth of the fish without any particular attention to its position relative to the fish line. The end of the remover should be pushed in at least as far as the point of the hook. The fish line 4 is now gently tightened and wrapped one turn about the stud 7. The rod 5 and the fish line are now grasped with the right hand.

Figure 7:
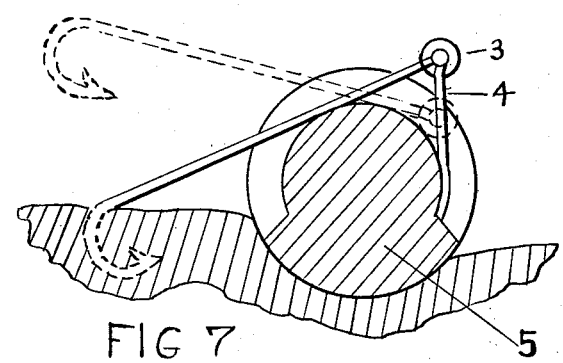
Figure 7 is a section along lines 7—7 in Figure 2, drawn to an enlarged scale. The section also shows the relationship of a fish hook engaging the gullet of a fish, shown in section, the fish line, and the disgorger at the time when the hook is to be removed.

The line is preferably held with the small and third finger in the crook of the fingers against the palm of the hand. With the first two fingers and thumb, the remover is turned to the right, that is clockwise. The line will then fall into the spiral groove bringing remover over to the hook. Continue to turn the remover. As the spring becomes wound taut, the rod acts as a fulcrum as shown in Figure 7. The line draws the eye of the hook down at the right side in Figure 7. The hook is first twisted into the spiral and then gently released out of the flesh and the fish hook moves to the dotted line position in Figure 7. Continue to turn remover as both the remover and hook are pulled out of the fish. During this entire operation of removing the fish hook after the line has been wrapped around the stud on the rod, the left hand is free for holding the fish or performing other operations.

Figures 4, 5:
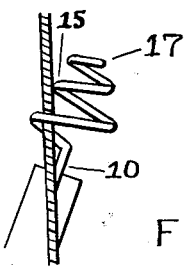
Figure 4 shows a portion of the fish hook disgorger placed in position to engage a line connected to a double or triple fish hook.
Figure 5 shows the same portion of the fish hook disgorger moved into position for maneuvering the line to the inside of the wire spiral.

As indicated, the rod 5 may be inserted in the mouth of the fish without any particular attention to the position of the fish line. However, with the fish struggling, the free end of line 4 is apt to get tangled. It is therefore suggested that the line 4 be first entered into the spiralled wire as shown in Figures 4 and 5. The fish line 4 is then pulled up through the spiralled wire until the fish has been drawn up into a position where the tip of rod 5 has entered into its mouth. The cord 4 is then wound around stud 7 as previously described.

If the hook is of the double or triple barbed type, hold the line taut with the right hand, as before.

Grasp the rod 5 by the pointed end and drop the first and widest convolution of the spiral over the taut fish line 4 in the manner shown in Figure 4. This line 4 may be attached at the upper end, not shown, to the eye of a double or triple fish hook.

Figure 6:
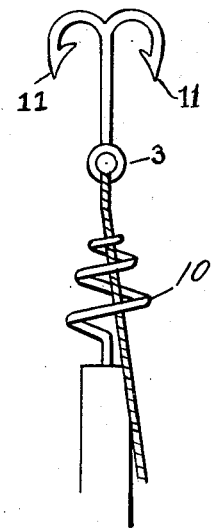
Figure 6 shows the rod being pushed toward the fish hook prior to removal.

Now move the remover relative to the taut line to bring it into position shown in Figure 5. Keeping the portion 10 in approximately the same position move the rod 5 in such manner that the point 15 where the cord touches the outside of the spiral is kept moving to the right up along the spiral until the point of contact passes the end of the wire at 17. The line now passes through all the coils as shown in Figure 6. The fish hook remover is now pushed along the taut line, upward in Figure 6, the last turn of the spiral, which is of small diameter, guiding the rod axis closest to the taut line. The wider coils elevate the hook to release it from the flesh of the fish and finally when the smallest coil of the spiral has passed over eye 3 the barbs come to rest against the coils of large diameter. The hook, line, and fish hook remover may all now be pulled out by the right hand.

While the spiral is shown as a wire, it will be obvious that the rod and the spiral may be made out of a single piece if the material is a plastic or other mouldable material.

I claim:

1. A fish disgorger comprising, in combination, a cylindrical rod pointed at one end, a handle consisting of a wire spiral giving a firm grip mounted axially at the other end of said rod, said rod having a spiral groove near the end that is pointed, and a stud extending radially through said rod beyond said groove suitable for attachment of a fish line which may be wound into said groove.

2. In a fish hook disgorger described in claim 1 wherein said handle consists of a wire spiral having a first turn of large diameter close to said rod and succeeding turns of progressively smaller diameter.

3. A fish hook disgorger used to remove a fish hook from the gullet of a fish comprising a cylindrical rod, said rod having a shallow spiral groove disposed in the surface thereof starting at a point near one end of said rod and extending over a part of the length of said rod, a radial stud extending out radially from the surface of said rod at a point beyond the end of said groove, and a handle located beyond said stud which is grasped when the cylindrical rod is to be turned about its axis.

References Cited in the file of this patent

UNITED STATES PATENTS

| | | |
|---|---|---|
| 780,244 | Truesdell | Jan. 17, 1905 |
| 1,629,583 | Nelson | May 24, 1927 |
| 1,761,733 | Locke | June 3, 1930 |
| 2,445,620 | Ketland | July 20, 1948 |
| 2,662,331 | Borup | Dec. 15, 1953 |